May 25, 1965

R. L. BARRETT 3,185,469

FIXTURE FOR CLAMPING ARTICLES TO A STRIP
FOR SUBSEQUENT BONDING

Filed May 21, 1962

INVENTOR.
R. L. BARRETT
BY
*L. Gundersen*
ATTORNEY

INVENTOR.
R. L. BARRETT 3,185,469
FIXTURE FOR CLAMPING ARTICLES TO A STRIP FOR SUBSEQUENT BONDING
Robert L. Barrett, Baltimore, Md., assignor to Western Electric Company, Incorporated, New York, N.Y., a corporation of New York
Filed May 21, 1962, Ser. No. 196,244
2 Claims. (Cl. 269—74)

This invention relates to a clamping fixture for a bonded assembly and has as its primary object the provision of a fixture for clamping articles to a strip in a predetermined pattern for subsequent bonding of the articles to the strip.

Another object of this invention is the provision of a rotary clamping fixture having arresting means to facilitate the sequential positioning of a series of articles and a strip clamped therein for subsequent bonding operations at each position.

With these and other objects in mind, the present invention contemplates a rotary plate provided with opposed clamping members for receiving a plurality of articles having a strip sandwiched therebetween. Arresting means are provided for restricting the rotary movement of the plate at successive positions to facilitate the bonding of articles to the strip at each position.

These and other objects and advantages of the invention will be apparent from the following detailed description of the fixture embodying the invention when read in conjunction with the drawings in which.

Figure 1:
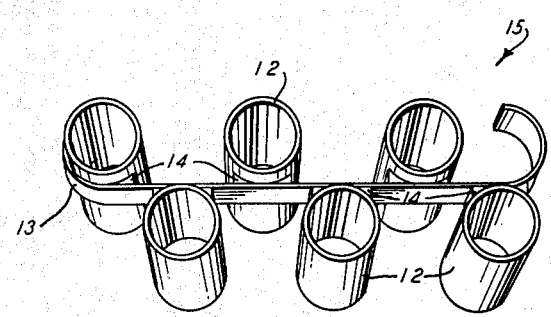
FIG. 1 is a perspective view showing a series of cylindrical articles such as bushings bonded to a metallic strip sandwiched between the articles.

Referring now to FIG. 1, a clamping fixture, generally designated by the reference numeral 11 (FIGS. 2 and 3), is provided for clamping two rows of cylindrical articles, such as bushings 12, with a metal strip 13 sandwiched therebetween. Solder 14 is subsequently applied in the molten state at the junctures of the bushings 12 and the strip 13 where, upon the cooling of the molten solder, the bushings are bonded to the strip to provide a completed assembly 15. Such a completed assembly may be used in a plastic shell to receive lightning protector units similar to the manner described in Patent 2,779,094, issued on January 29, 1957 to F. A. Christoffel.

Figure 3:
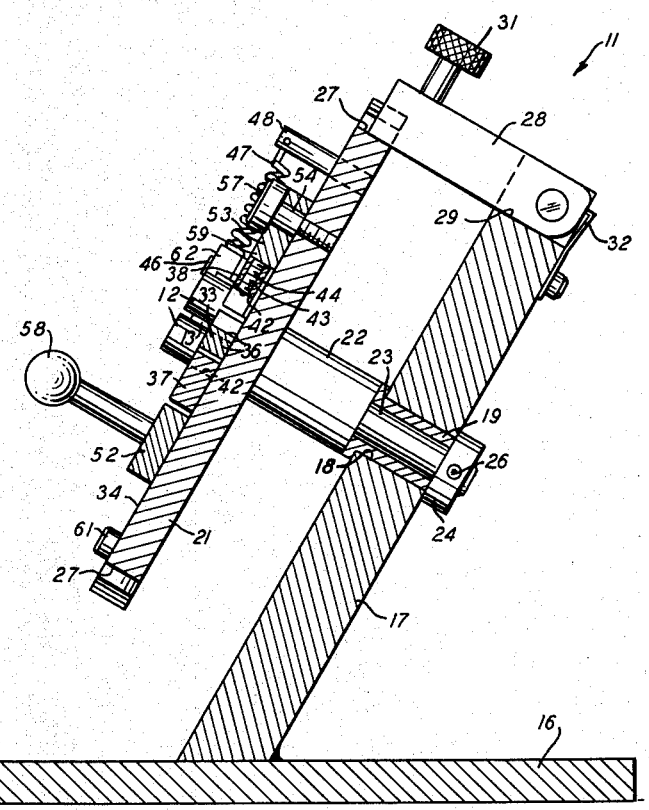
FIG. 3 is a view taken along line 3—3 of FIG. 2 showing support and rotatable features of the plate.
Figure 2:
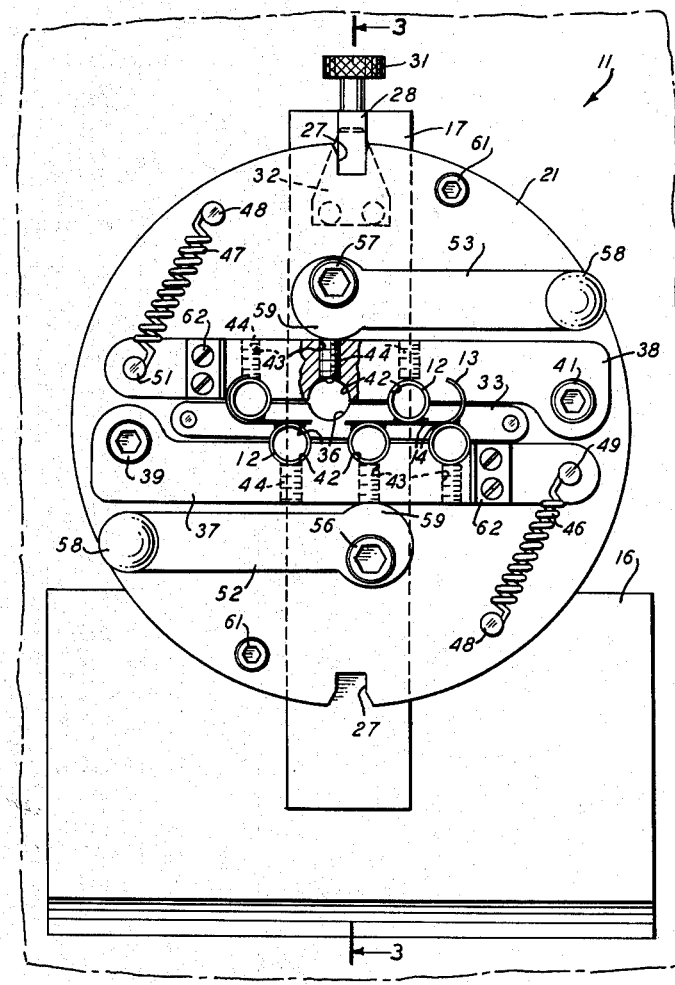
FIG. 2 is a view showing clamping members mounted on a rotatable plate with arresting means for restricting the rotation of the plate.

As shown in FIGS. 2 and 3, the fixture 11 is provided with a base 16 which is positioned on a table (not shown). A support 17 extends upwardly and at an angle from the base 16 and is provided with an aperture 18 intermediate the ends thereof for receiving a bushing 19 therein. A circular plate or disc 21 is provided with a hub 22 which extends centrally therefrom and a shaft 23 which extends from the hub 22 and is positioned within the bushing 19, as shown in FIG. 3. A retainer ring 24 is positioned about the free end of the shaft 23 and a dowel 26 is positioned through apertures formed in the ring 24 and the shaft 23 to retain the shaft, and hence the plate 21, in a rotatable relation with respect to the support 17. The plate 21 is provided with a pair of slots 27 formed in diametrically opposite sides of the periphery of the plate for receiving an arresting bar 28 which is pivotally mounted within a slot 29 formed in the free end of the support 17. To facilitate the pivotal movement of the bar 28, a knurled knob 31 is mounted upon the bar. A spring plate 32 is mounted on the free end of the support 17 and engages the bar 28 to urge the bar into engagement with one of the slots 27 of the plate 21 thereby arresting rotational movement of the plate at predetermined positions.

A bar 33 is fixedly mounted in a substantially diametrical position on a face 34 of the plate 21 and is provided with a predetermined plurality of transverse arcuate slots or cutaways 36 on each of the longitudinal edges thereof for receiving the bushings 12 therein. A pair of arms 37 and 38 are pivotally mounted on the face 34 of the plate 21 about threaded members 39 and 41, respectively, and are positioned so that the bar 33 is mounted therebetween. Each bar is provided with a plurality of arcuate slots or cutaways 42 which are positioned in opposing fashion to the arcuate slots 36 formed in the bar 33. In addition, threaded apertures 43 extend from each of the arcuate slots 42 of the arms 37 and 38 and are provided for the reception of spring-loaded plungers 44 which project into the openings formed by the slots 42.

A pair of tension springs 46 and 47 are fastened at one end thereof to pins 48 which are fixedly mounted on the face 34 of the plate 21. The opposite extremities of the springs 46 and 47 are fastened to pins 49 and 51 mounted in the free ends of the pivotal arms 37 and 38, respectively. It is to be noted that the biasing action of the tension springs 46 and 47 normally urges the arms 37 and 38 pivotally away from the bar 33. A second pair of arms 52 and 53 are mounted at one end thereof for rotation about a shank portion 54 (FIG. 3) of threaded members 56 and 57, respectively, wherein the threaded members are mounted in the plate 21. Each of the rotatable arms 52 and 53 are provided at the free ends thereof with a knob 58 to facilitate the rotation thereof and with an eccentric portion 59 at the opposite extremity thereof. It is to be noted that the arms 52 and 53 are rotatably mounted on the face 34 of the plate 21 so that the eccentric portions 59 thereof engage the pivotal arms 37 and 38, respectively. A pair of threaded members 61 are mounted in the plate 21 to provide a stop for the rotatable arms 52 and 53.

In the operation of the fixture 11, the rotatable arms 52 and 53 are normally positioned against the stops 61 in a nonoperating position so that the pivotal arms 37 and 38 are pivoted away from the bar 33 due to the biasing action of the tension springs 46 and 47, respectively. Further, the bar 28 is positioned within a first of the pair of slots 27 of the plate 21 to arrest rotary movement of the plate. An operator loosely positions a first row of bushings 12 within the upper slots 36 of the bar 33 and a second row of bushings 12 within the slots 42 of the pivotal bar 37. The strip 13, having curved ends, is positioned loosely between the previously inserted two rows of bushings 12 and the operator rotates the arms 52 and 53 so that the eccentric portions 59 thereof engage the pivotal arms 37 and 38, respectively, to urge the loosely assembled rows of bushings 12 and the strip 13 in a clamped or locked assembly, as shown in FIG. 2. It is to be noted that each pivotal arm 37 and 38 is provided with a stepped guide 62 to facilitate the positioning of the curved end of the strip 13 with respect to the bushings 12. After the assembly is clamped, the operator applies the solder 14 to the juncture of the first row of bushings 12 and the strip 13 thereby bonding the first row of bushings to the strip. The arresting bar 28 is pivoted upwardly and out of engagement with the first slot 27 and the plate 21 is rotated until the next succeeding or second slot 27 is positioned beneath the bar 28. The operator releases the arresting bar 28 immediately after rotating the plate 21 where, upon the action of the spring plate 32, the bar subsequently comes to rest in the second slot 27 thereby preventing further rotation of the plate 21. The previously bonded first row of bushings 12 are now positioned on the underside of the strip 13. The operator applies solder to the juncture of the second row of bushings 12 and the strip 13 thereby bonding the second row of bushings to the strip. The arms 52 and 53 are rotated to a position against the stops 61 whereby the pivotal arms 37 and 38, by the action of the springs 46 and 47, are urged away from the bar 33 and the completed assembly 15 is removed from the fixture.

It is to be understood that the above-described arrangements are simply illustrative of the principles of the invention. Other arrangements may be devised by those skilled in the art which will embody the principles of the invention and fall within the spirit and scope thereof.

What is claimed is:

1. A clamping fixture for clamping a strip sandwiched between two rows of cylindrical articles for subsequent bonding of the articles to the strip, which comprises:
   a support,
   a disc mounted for rotation on the support,
   a pair of arms having transverse spaced arcuate cutaways along one edge thereof pivotally mounted on one face of the disc,
   a bar fixedly mounted on the disc between the arms having transverse spaced arcuate cutaways along both edges thereof, the arcuate cutaways of the bar positioned opposite the arcuate cutaways of the pivotal arms to receive the cylindrical articles therein, the arcuate cutaways along both edges of the bar being aligned with respective spaces between cutaways of the opposite edge, the arcuate cutaways of opposite edges of the fixed bar spaced so that the two rows of cylindrical articles which are subsequently positioned therein provide a substantial space therebetween for the positioning of the strip between the rows of cylindrical articles,
   means for normally urging the arms away from the fixed bar,
   a pair of eccentrics mounted on the disc,
   means for moving the eccentrics into engagement with the pivotal arms and urging the pivotal arms towards the fixed bar so that the rows of cylindrical articles which are positioned in the cutaways of the fixed bar and the pivotal arms are clamped with the strip, and
   means for successively arresting rotary movement of the disc at predetermined positions to facilitate the bonding of each row of the articles to the strip.

2. A clamping fixture for clamping two rows of cylindrical bushings to a strip held therebetween for subsequent bonding of the rows of bushings to the strip, which comprises:
   a support,
   a circular plate mounted for rotation on the support,
   a bar fixedly mounted in a substantially diametrical position on one face of the plate, the bar formed with a plurality of spaced arcuate cutaways transversely in both longitudinal edges thereof, the arcuate cutaways along both edges of the bar being aligned with respective spaces between cutaways of the opposite edge,
   a pair of pivotally opposed arms mounted on the plate on each side of the longitudinal edges of the fixed bar, each pivotal arm formed with arcuate cutaways transversely in one longitudinal edge thereof, the pivotal arms mounted so that the arcuate cutaways thereof are positioned opposite to the arcuate cutaways of the fixed bar to receive two rows of a predetermined number of bushings therebetween, the arcuate cutaways of opposite edges of the fixed bar spaced so that the two rows of cylindrical articles which are subsequently positioned therein provide a substantial space therebetween for the clamping of the strip between the rows of cylindrical articles,
   a pair of springs connected between the free ends of the pivotal arms and the plate for normally urging the pivotal arms away from the fixed bar,
   a pair of eccentrics mounted on the plate adjacent to the pair of pivotal arms,
   means for moving the eccentrics into engagement with the pair of pivotal arms so that the arms are pivoted towards the fixed bar and the articles in the arcuate cutaways are clamped with the strips,
   a pair of diametrically opposite slots formed in the periphery of the circular plate, and
   a bar pivotally mounted in the support for successively engaging the slots of the circular plate so that the rotary movement of the plate is arrested during successive periods when each row of bushings are bonded to the strip.

References Cited by the Examiner

UNITED STATES PATENTS

| | | | |
|---|---|---|---|
| 586,359 | 7/97 | Holt | 269—236 |
| 1,942,728 | 1/34 | Perlstein | 269—275 X |
| 2,438,989 | 4/48 | Billman | 269—270 |
| 2,495,250 | 1/50 | Gilly | 269—68 X |
| 2,688,267 | 9/54 | Schmuldt | 269—43 X |
| 2,843,072 | 7/58 | Winkel et al. | 113—99 |

FOREIGN PATENTS 252,603   6/26   Great Britain.

ROBERT C. RIORDON, *Primary Examiner.*

THOMAS J. HICKEY, *Examiner.*

UNITED STATES PATENT OFFICE
CERTIFICATE OF CORRECTION

Patent No. 3,185,469                                                                    May 25, 196

Robert L. Barrett

It is hereby certified that error appears in the above numbered patent requiring correction and that the said Letters Patent should read as corrected below.

Column 3, line 34, for "positioning" read -- clamping --

Signed and sealed this 12th day of October 1965.

(SEAL)
Attest:

ERNEST W. SWIDER                                                 EDWARD J. BRENNER
Attesting Officer                                                   Commissioner of Patents